Figure 1:
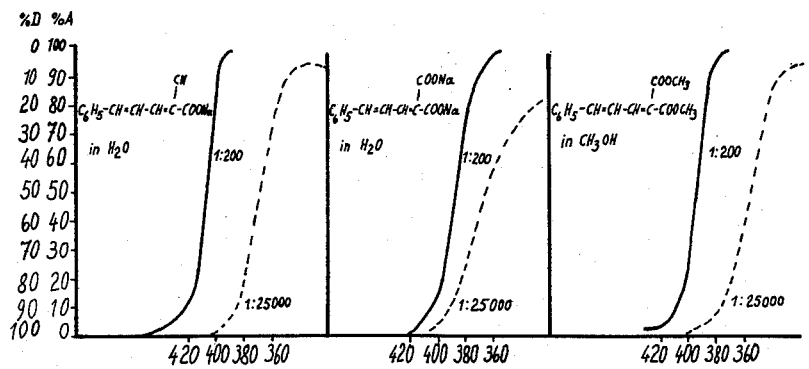
Figure 2:
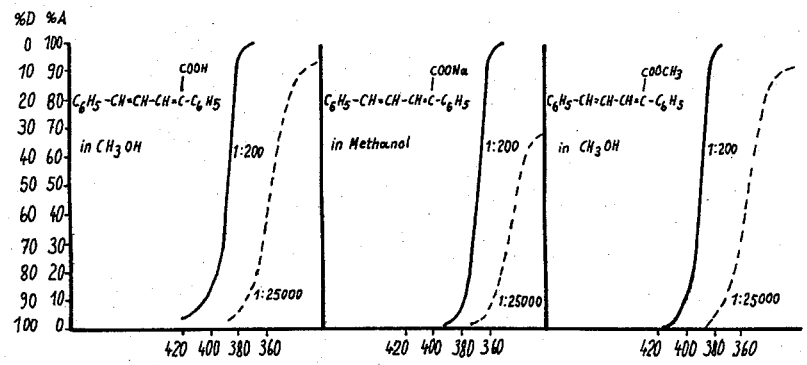
Figure 3:
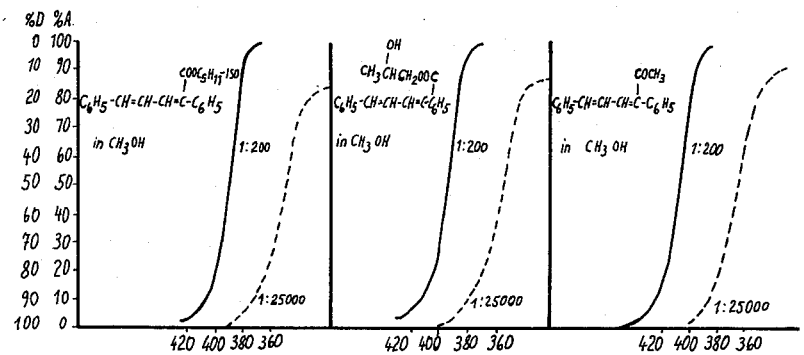

March 17, 1964     O. WAHL ETAL     3,125,597
ANTI-FADING AGENTS ABSORBING ULTRA-VIOLET RAYS

INVENTORS:
OTTMAR WAHL, JOHANNES GÖTZE
BY
ATTORNEY

United States Patent Office 3,125,597
Patented Mar. 17, 1964

3,125,597
ANTI-FADING AGENTS ABSORBING ULTRA-VIOLET RAYS
Ottmar Wahl, Baden-Baden, and Johannes Götze, Cologne-Stammheim, Germany, assignors to Agfa Aktiengesellschaft, Leverkusen, Germany, a corporation of Germany
Filed Mar. 11, 1960, Ser. No. 14,357
Claims priority, application Germany Mar. 12, 1959
2 Claims. (Cl. 260—469)

Many organic compounds are known which are suitable as ultraviolet absorbing agents and which protect more especially organic substances against the harmful influence of ultraviolet rays. However, these known ultraviolet absorbing agents do not satisfy all requirements which arise from the large number of very different fields of application.

It has now been found that derivatives of 1-phenyl-buta-1,3-diene of the general formula

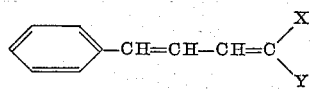

in which X is a carboxyl (—COOH), alkoxycarbonyl (—COO-alkyl), alkylcarbonyl (—CO-alkyl), alkylcarbamoyl (—CONH-alkyl), dialkylcarbamoyl (—CON-alkyl$_2$), or cyano radical, and Y is a phenyl, carboxyl, alkoxycarbonyl, or alkylcarbonyl radical, are especially suitable as ultraviolet absorbing agents. Furthermore, the phenyl radicals or the alkyl radicals may be substituted by substituents which have no chromophoric character, for example, by halogen atoms or by hydroxyl, sulfonic acid or sulfo (—SO$_3$H), or carboxyl groups, or by esterified sulfonic acid or carboxyl groups. The term "alkyl radical" includes not only aliphatic but also cycloaliphatic alkyl radicals, more especially those containing from 1 to 20 carbon atoms. Furthermore, salts of alkali metals, ammonia, and salts of amines or other salts may be used instead of the free carboxylic or sulfonic acids.

FIGURES 1 to 4 of the drawings are ultraviolet absorption spectra of some compounds of the present invention. These spectra relate to a layer having a thickness of 2 millimeters of a solution of the compound in the solvent specified on the drawings at dilutions of 1:200 and 1:25,000.

The disclosed compounds absorb ultraviolet light, as shown in FIGS. 1 to 4, in aqueous and also in organic solvents, with very high intensity and very favorable selectivity. The visible light is transmitted in practice, so that the compounds are usually colorless, whereas the ultraviolet is absorbed up to the boundary of the visible light. It is important that the absorbed light is not converted into visible fluorescent light, as is the case with many compounds which have an absorbing action in the region of the longer ultraviolet light waves, and that the substances are sufficiently stable and do not change into colored compounds on exposure to light. The materials in which these compounds are incorporated, such as, for example, foils or lacquers, remain clear and colorless, even after exposure to light over a relatively long period. Physical properties which are important for the compound in question, such as, for example, the melting point and the solubility, are determined by the nature of the substituents or the nature of the radicals X and Y. Compounds which contain sulfonic acid or carboxyl groups are soluble in water, either as such or in the form of their alkali metal, ammonium or amine salts. They are thus particularly suitable for the production of shaped articles, especially protective coatings with the aid of hydrophilic film-forming synthetic or natural products such as gelatin, casein, polymers of ethylenically unsaturated monomers, which polymers contain hydroxyl, carboxyl, sulfonic acid or carbamoyl groups and which are soluble in aqueous solutions either as such or in the form of their salts with alkali metals, ammonia or amines. Such polymers are, for instance, polyacrylic acid, polymethacrylic acid, copolymers of monoethylenically unsaturated monomers which are devoid of water-solubilizing groups with monoethylenically unsaturated monomers containing water-solubilizing groups, such as copolymers of acrylic, methacrylic, maleic or fumaric acid esters with acrylic and methacrylic acid, maleic and fumaric acid semi esters, polyvinyl alcohol, partially hydrolyzed copolymers of vinyl chloride and vinyl acetate, sulfonated polymers of monovinyl aromatic compounds such as polystyrene and polyacrylamide. The ultraviolet absorbing agents of the present invention can, for example, be added to aqueous solutions of gelatin or polyacrylamide, which when coated on a suitable support and dried, form clearly transparent films absorbing ultraviolet light. A very wide range of different materials can be protected against the action of ultraviolet light by such coatings and also by impregnation from aqueous solutions.

Compounds of the foregoing formula in which X is an alkoxycarbonyl, alkylcarbonyl, alkylcarbamoyl, dialkylcarbamoyl, or cyano radical, and Y is phenyl, or an alkylcarbonyl or alkoxycarbonyl radical, are soluble in a very wide range of organic solvents. In addition, depending on the choice of the alkyl radical, it is possible to obtain compounds with a very high melting point or which are liquid at normal temperature. They are particularly suitable for the production of organic protective lacquers or for incorporation into foils or fibrous material of organic compounds of high molecular weight. They protect such colored materials against discoloration under the action of light and prevent the materials from becoming brittle. Suitable foils and fibrous products of this type are for instance water-insoluble polymers of mono-ethylenically unsaturated monomers such as vinyl chloride, vinyl acetate, styrene, ethylene, propylene, acrylic and methacrylic acid esters such as methyl methacrylate, ethylacrylate, copolymers thereof, polyacrylonitrile, polyamides, polyurethanes, polyesters, such as polymeric caprolactams, nylons, polyethylene terephthalate, and polyaddition products of glycols and diisocyanates. In addition, colorless and transparent foils which absorb ultraviolet light can be produced, which foils are suitable as antifading curtains in front of shop window decorations or other exhibition articles or as protective foils for pictorial material. By means of the antifading agents according to the present invention it is possible to produce packing materials such as from cellulose esters (cellulose acetate, cellulose acetobutyrate) and polyethylene, which protect the packed articles, for example, foods, against the action of light and thus against becoming spoiled, for example, by becoming rancid. As regards this field of application, it is important that the antifading agents have no harmful effect on the human organism. For the same reason, these antifading agents are especially suitable for the production of pastes, ointments and oils for protecting the skin against sunburn.

The said compounds can also be successfully employed in the photographic field, for example, for the manufacture of ultraviolet filters which are positioned in front of the objective when making the photographic exposure, or for the production of ultraviolet filter layers in a photographic material. For this purpose, the water-soluble compounds can be dissolved in gelatin layers or the compounds which are not water-soluble can be finely dispersed in the layer colloid. Color photographic materials can be improved as regards their resistance to light by means of the compounds of the invention. The finished colored pictures can be protected against the action of light by coating them with protective layers containing the compounds of the present invention or they can be washed after processing in an aqueous solution of these antifading agents. Color pictures obtained by means of chromogenic development can also be improved as regards their fastness to light if the water-insoluble antifading agents of the invention are incorporated and finely dispersed in the photographic layers together with the color components. After the color development, the image dyestuffs are better protected against the action of light than in the case in which the components are incorporated by the hitherto known methods.

It is furthermore possible to incorporate the water-insoluble compounds of the present invention into combinations of ethylenically unsaturated polyesters produced from dihydric alcohols and α,β-ethylenically unsaturated dicarboxylic acids with monomers which are liquid under normal conditions (styrene, methyl methacrylate) which combinations are cured under polymerizing conditions to produce shaped articles (see U.S. Patent No. 2,255,313). In order to render these articles flameproof the said combinations may contain components having halogen substituents as disclosed in U.S. Patents No. 2,863,794; 2,863,795 and 2,863,848.

The possibilities of application of the compound of the present invention mentioned herein are given by way of example only. The water-soluble compounds may be applied in amounts of about 0.1 to 50 percent, preferably 1–20 percent, as calculated on the amount of the film-forming agent, and the water-insoluble compounds in amounts of about 0.1 to 10 percent, preferably 0.1 to 1 percent, as calculated on the amount of organic product to be protected, each of these amounts being percentages by weight.

The accompanying table sets out a number of compounds which are useful as antifading agents in accordance with the foregoing description and also includes their most important physical properties.

The compounds of the present invention can be manufactured by known processes, for example, by condensing cinnamaldehyde or ring-substituted cinnamaldehydes in known manner with malonic acid or esters thereof. The condensation products of cinnamaldehydes with malonic acid can also be esterified by known methods with various alcohols. Phenylacetic acid or cyanoacetic acid and their esters can also be used instead of malonic acid or its esters. The cinnamaldehydes can also be condensed with alkyl benzyl ketones.

*Examples*

In the formulae which follows, "$C_6H_5$" when used, is intended to indicate the phenyl radical, and "abs. max." is an abbreviation of the wave length of the maximum absorption band.

(1)
$$C_6H_5-CH=CH-CH=\underset{\underset{\displaystyle COOH}{|}}{C}-CN$$

Yellow crystals, M.P. 210° C. (Beilstein, Handbuch d. org. Chemie, vol. IX, p. 913.)

(2)
$$C_6H_5-CH=CH-CH=\underset{\underset{\displaystyle COONa}{|}}{C}-CN$$

Colorless crystals, abs. max. 335 millimicrons, steep absorption at 400–420 millimicrons, as shown by the first pair of curves in FIG. 1 of the drawings. This compound is made from the free acid which is dissolved in ethanol and the equivalent amount of sodium ethylate is added.

(3)
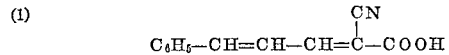

Yellow crystals, M.P. 115° C. (Beilstein, Handbuch d. org. Chemie, vol. IX, p. 913.)

(4)
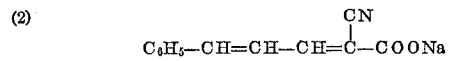

Figure 4:
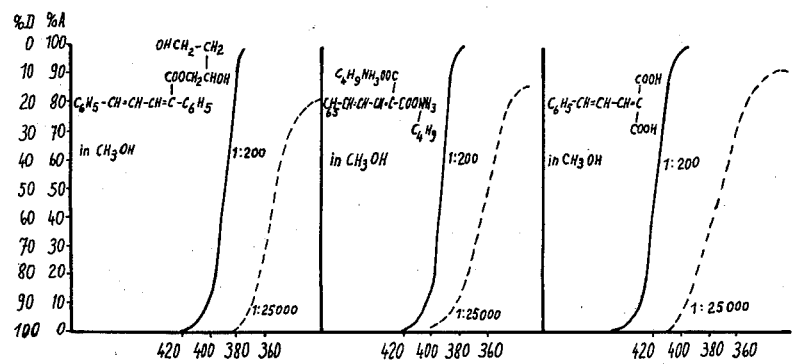

Yellow crystals, M.P. 207° C.; see the last pair of curves in FIG. 4. (Beilstein, Handbuch d. org. Chemie, vol. IX, p. 912.)

(5)
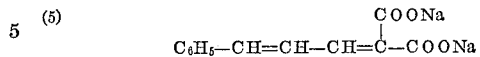

White crystals, M.P. above 360° C., abs. max. 325 millimicrons, steep absorption at 370–400 millimicrons; see the second pair of curves in FIG. 1. The compound is made from the free acid which is neutralized with a solution of sodium ethylate (sodium ethoxide) prepared by dissolving sodium metal in ethanol.

(6)
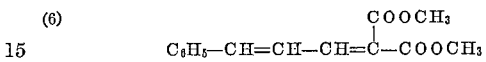

(Beilstein, Handbuch d. org. Chemie, vol. IX, p. 912.)
White crystals, M.P. 62° C., abs. max. 320 millimicrons, steep drop at 380–400 millimicrons; see the last pair of curves in FIG. 1.

(7)
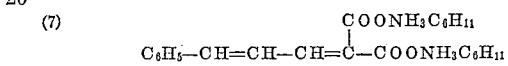

White crystals soluble in methanol. To make this compound 11 g. of 4-phenyl-1,3-butadiene-dicarboxylic acid (compound 4 hereinbefore) are dissolved in 120 ml. of warm isopropanol. With cooling 10 ml. of cyclohexylamine are added. The cyclohexylamine salt thus formed separates as crystals in a yield of 18 grams.

(8)
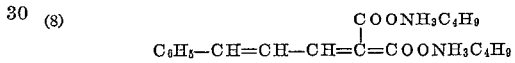

White crystals, M.P. 128° C.; soluble in methanol. Abs. max. 330 millimicrons, steep absorption at 390–400 millimicrons; see the second pair of curves in FIG. 4. To make the compound there is added to a solution of 77 g. of the free acid in 600 ml. of isopropanol 53 g. of n-butylamine.

(9)
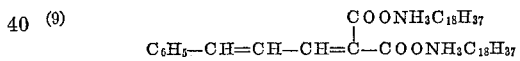

White crystals, sparingly soluble in methanol and ethyl acetate, M.P. 121° C. This compound is made by mixing solutions of 44 g. of the free acid in hot ethanol, and of 108 g. of stearylamine in hot ethanol. The mixture is cooled, the crystallized product is filtered and washed with ethanol and ether. Recrystallization is possible from ethyl acetate.

(10)
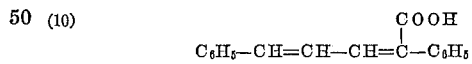

(Beilstein, Handbuch d. org. Chemie, vol. IX, p. 708.)
Almost colorless crystals, M.P. 188° C.; readily soluble in alcohol, abs. max. 320 millimicrons, steep absorption at 380–400 millimicrons; see the first pair of curves in FIG. 2.

(11)
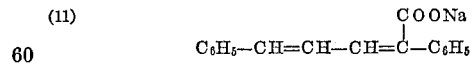

(Beilstein, Handbuch d. org. Chemie, vol. IX, p. 708.)
White flakes, abs. max. 320 millimicrons, steep absorption between 360 and 380 millimicrons; see the second pair of curves in FIG. 2.

(12)
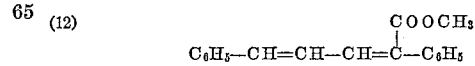

(Beilstein, Handbuch d. org. Chemie, vol. IX, p. 708.)
White crystals, M.P. 82° C., abs. max. 323 millimicrons, steep absorption between 380 and 400 millimicrons; see the third pair of curves in FIG. 2.

(13)
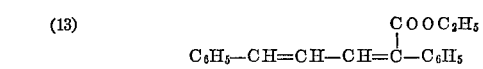

White crystals, M.P. 52° C. To make this compound, the free acid is esterified with ethanol in the presence of H₂SO₄.

(14)
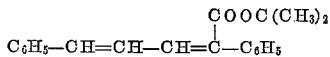

Yellow oil, B.P. 198° C./0.4 mm. Hg. Prepared by esterification of the acid with isopropanol in the presence of H₂SO₄.

(15)
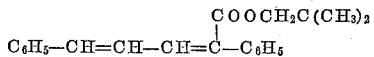

Highly viscous oil, B.P. 199–202° C./0.2–0.3 mm. Hg. Made by esterifying the free acid with isobutanol in the presence of H₂SO₄.

(16)
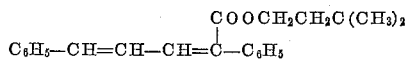

(Beilstein, Handbuch d. org. Chemie, vol. IX, p. 708.)

Highly viscous oil, B.P. 198° C./0.2 mm. Hg; abs. max. 325 millimicrons; steep absorption between 300 and 400 millimicrons; see the first pair of curves in FIG. 3.

(17)
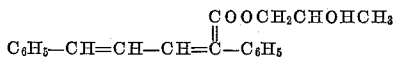

Highly viscous oil, B.P. 225–235° C./0.4 mm. Hg, abs. max. 325 millimicrons, steep absorption between 380 and 400 millimicrons; see the second set of curves in FIG. 3. Made by mixing 400 g. of the acid, 200 g. of 1,2-propanediol (propyleneglycol) and 3 ml. of H₂SO₄, and heating the mixture for 24 hours at 100° C. The mixture is then poured into water and heated with ether. The etherical layer is washed first wtih an aqueous solution of soda and finally with water, dried and distilled under reduced pressure.

(18)
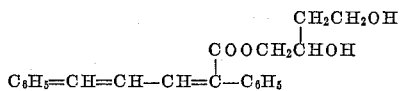

Thick viscous oil, abs. max. 323 millimicrons, steep absorption between 380 and 400 millimicrons; see the first pair of curves in FIG. 4. Prepared by mixing 85 g. of the acid, 300 g. of butanetriol-1,2,4 and 4 ml. of H₂SO₄, and working up as described under compound 17.

(19)
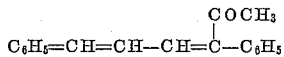

Yellowish white crystals, B.P. 185–189° C./0.3 mm. Hg; M.P. 78° C., abs. max. 325 millimicrons; steep absorption between 400 and 420 millimicrons; see the third pair of curves in FIG. 3. To make this compound 25 g. of phenylacetone and 25 g. of cinnamaldehyde are mixed, cooled in an icebath and saturated with hydrogen chloride. After 24 hours the mixture is dissolved in ethanol by heating, filtered, crystallized by cooling in an acetone bath, decanted from the alcohol and distilled under reduced pressure.

(20)
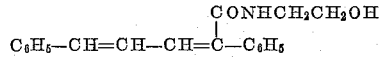

White crystals, M.P. 152° C., abs. max. 320 millimicrons, steep absorption between 360 and 380 millimicrons.

(21)
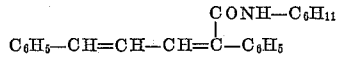

White crystals, M.P. 177° C., abs. max. 320 millimicrons, steep absorption between 360 and 380 millimicrons.

(22)
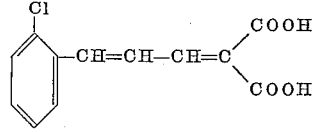

Yellowish white crystals, M.P. 219° C. To make this compound 20 g. of 2-chlorocinnamaldehyde, 20 g. of malonic acid and 20 g. of acetice acid are heated for 5 hours on a steam bath. The crystals that precipitate are filtered by suction, washed with chloroform and recrystallized from ethanol.

(23)
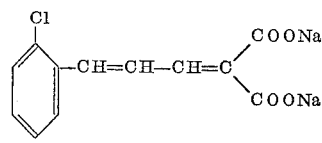

The free acid (Formula 22 whose preparation is described hereinabove) is neutralized with sodium ethylate. The salt that formed separated at once. The precipitate is filtered by suction and washed with a mixture of alcohol and ether.

What is claimed is:

1. An amine salt of 1,1-dicarboxy-4-phenyl-1,3-butadiene of the formula

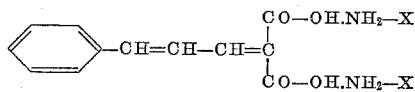

in which X is an alkyl radical containing up to 18 carbon atoms.

2. A hydroxyalkyl ester of 1-carboxy-1,4-diphenyl-1,3-butadiene of the formula

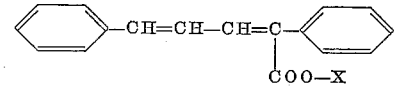

in which X is a hydroxyalkyl radical of the group consisting of 2-hydroxypropyl and 2,4-dihydroxybutyl.

References Cited in the file of this patent

UNITED STATES PATENTS

| | | |
|---|---|---|
| 2,241,239 | Carroll et al. | May 6, 1941 |
| 2,440,070 | Blout et al. | Apr. 20, 1948 |
| 2,554,142 | Grummitt | May 22, 1951 |
| 2,614,090 | Averill | Oct. 14, 1952 |
| 2,748,021 | Van Allan | May 29, 1956 |
| 2,759,820 | Neugebauer et al. | Aug. 21, 1956 |
| 2,768,077 | Neugebauer et al. | Oct. 23, 1956 |
| 2,775,574 | Slocombe et al. | Dec. 25, 1956 |

OTHER REFERENCES

Journal of American Chemical Society, volume 72, page 2670.

Coenen et al.: Zeitschrift für Elektrochemie, volume 57, No. 91,953.